Sept. 15, 1925.
W. SCHMID
LINE GUIDE FOR REELS
Filed April 17, 1924
1,554,132
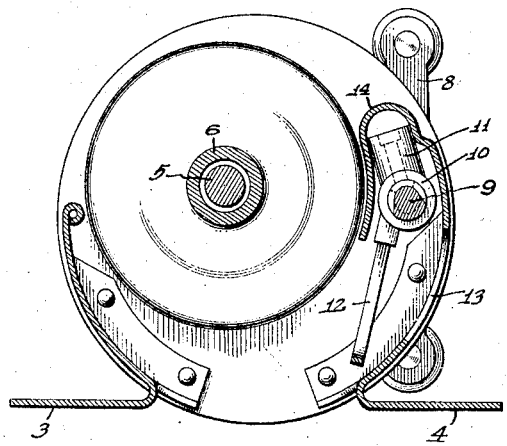
Fig. 1.
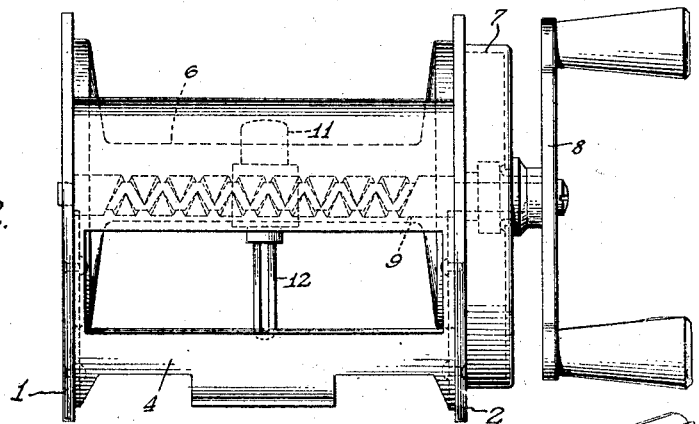
Fig. 2.
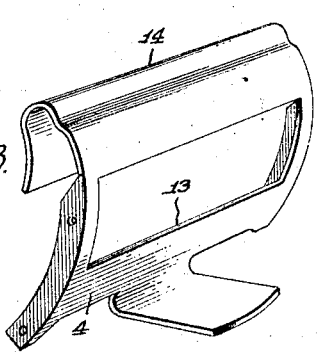
Fig. 3.
Fig. 4.
INVENTOR.
BY William Schmid.
ATTORNEYS Patented Sept. 15, 1925.

1,554,132

UNITED STATES PATENT OFFICE.

WILLIAM SCHMID, OF COLDWATER, MICHIGAN.

LINE GUIDE FOR REELS.

Application filed April 17, 1924. Serial No. 707,055.

*To all whom it may concern:*

Be it known that I, WILLIAM SCHMID, a citizen of the United States, residing at Coldwater, in the county of Branch and State of Michigan, have invented certain new and useful Improvements in Line Guides for Reels, of which the following is a specification, reference being had therein to the accompanying drawings.

In my Patent No. 1,456,283, dated May 22, 1923, there is disclosed a level wind antiback lash reel in which a reel seat member has a guide rib for engaging a guide head to prevent tilting of the same during transverse movement of the guide head for guiding a line on to the reel spool. The line is wound over the spool by a counterclockwise rotation of the spool, and practically the same construction is disclosed in my Patent No. 1,472,684 dated Oct. 20, 1923.

In another Patent No. 1,461,586, dated July 10, 1923, a reel seat member has a slot into which a guide head extends and is held against a tilting action, the arrangement being such that the line is wound on the spool by counterclockwise rotation thereof. In contradistinction to such over spool line winding, I have devised a reel wherein the level wind mechanism is arranged for under spool line winding by rotating the spool of the reel in a clockwise direction, and a reel seat member is arranged as a guard for the level wind mechanism and also as means to prevent the guide head from tilting during the operation of the reel.

There are distinct advantages gained by under spool line wind. First, the angle of the line relative to a fishing rod is reduced, so that the fishing line approaches the horizontal and is closer to alinement with the line guides of the rod, consequently there is less wear and tension on the line at the rear guide of the fishing rod. Second, with the line guide projecting downwardly under the front side of the reel there can be no interference with "thumbing" of the reel. Third, the guide through which the line passes is more fully protected on account of being in greater proximity to a reel seat member which incloses the level wind mechanism.

The above are a few of the advantages gained by the construction to be hereinafter described by aid of the drawing, wherein—

Figure 1 is a cross sectional view of a level wind fish reel embodying features of my invention;

Fig. 2 is a front elevation of the same;

Fig. 3 is a perspective view of a detached reel seat member, and

Fig. 4 is a similar view of a modified form of reel seat member.

In the drawing, the reference numerals 1 and 2 denote reel heads connected by reel seat members 3 and 4 by which the reel may be conveniently attached to a fishing rod. Rotatable in the heads 1 and 2 is a spool shaft 5 supporting a spool 6 adapted to have a line wind thereon by a clockwise rotation of said spool, when viewed as in Fig. 1. On the head 2 of the reel is a casing 7 containing an operating mechanism by which the shaft 5 may be driven from a crank 8 at the outer side of the casing 7, and the operating mechanism may be gearing or any form of power transmission mechanism by which the spool 6 may be driven in a clockwise direction for winding a line thereon.

The operating mechanism within the casing 7 also drives a screw shaft 9 for a traversing guide head 10 thereon and said guide head includes a nut socket 11 and a loop line guide 12.

The reel seat member 4 has a window or opening 13 through which is trained a line that extends through the loop guide 12 and is adapted to be wound or unwound relative to the spool 6. A longitudinal edge of the seat member 4 is formed with a shield or guard portion 14 which is substantially inverted U-shaped in cross section, said guard forming a transverse guideway into which extends the nut socket 11 and in consequence of the guard being stationary the guide head 10 cannot tilt on the screw shaft 9. The loop guide 12 extends downwardly, considering Fig. 1, from the guide head 10 and is at all times in position to guide a line to and from the underside of the spool 6.

Instead of making the shield or guard 14 integral with the reel seat member 4, as shown in Fig. 3, I may make the shield or guard separate and attach it to the reel seat member 4 by rivets 15, spot welding or in any other form of fastening means.

By reference to Fig. 1, it will be noted that the line guide mechanism is covered by the shield or guard; that there are no slots or openings in such guard through which dirt might pass, and that the loop guide 12 extends downwardly out of the guard in contradistinction to extending over the upper side of the spool.

I do not care to confine my invention to any specific form of driving mechanism for the spool and the line guide mechanism, but desire to adapt my invention to a reel in which the spool is revolved in a clockwise direction for winding a line thereon at the lower side of the spool.

What I claim is:

1. In a fishing reel having a spool which is revolved in a direction to wind the line on the spool at the rod side of the spool; a level wind mechanism operatable in synchronism with the spool and having a line guide adjacent the rod side of the spool, and a guard enclosing the level wind mechanism and forming part of a reel seat member.

2. A fish reel comprising reel seat members, one of said reel seat members having a curved wall provided with a line opening, heads, a spool between said heads and adapted to have a line wound thereon from the rod side of said spool; a level wind mechanism, operatable in synchronism with said spool, said level wind mechanism including a line guide and nut socket, operating means for said spool and level wind mechanism, and a guard for said level wind mechanism supported by the edge of the curved wall of said reel seat member with the nut socket of said level wind mechanism extending into said guard and said line guide extending out of said guard and in proximity to the curved wall of said reel seat member.

3. In a fishing reel having a spool, and a level wind mechanism; a reel seat member for said reel, said reel seat member having a curved wall terminating in a guard for said level wind mechanism, said member wall having a line opening, and a line guide forming part of said level wind mechanism and extending out of said guard between said spool and the wall opening towards the reel seat portion of said member.

In testimony whereof I affix my signature.

WILLIAM SCHMID.